June 18, 1957 G. O. EVANS 2,796,142
UNIVERSAL MOUNTING FOR VEHICLE STEERING GEAR
Filed Nov. 3, 1954 3 Sheets-Sheet 1

INVENTOR.
George O. Evans.
BY
ATTORNEYS

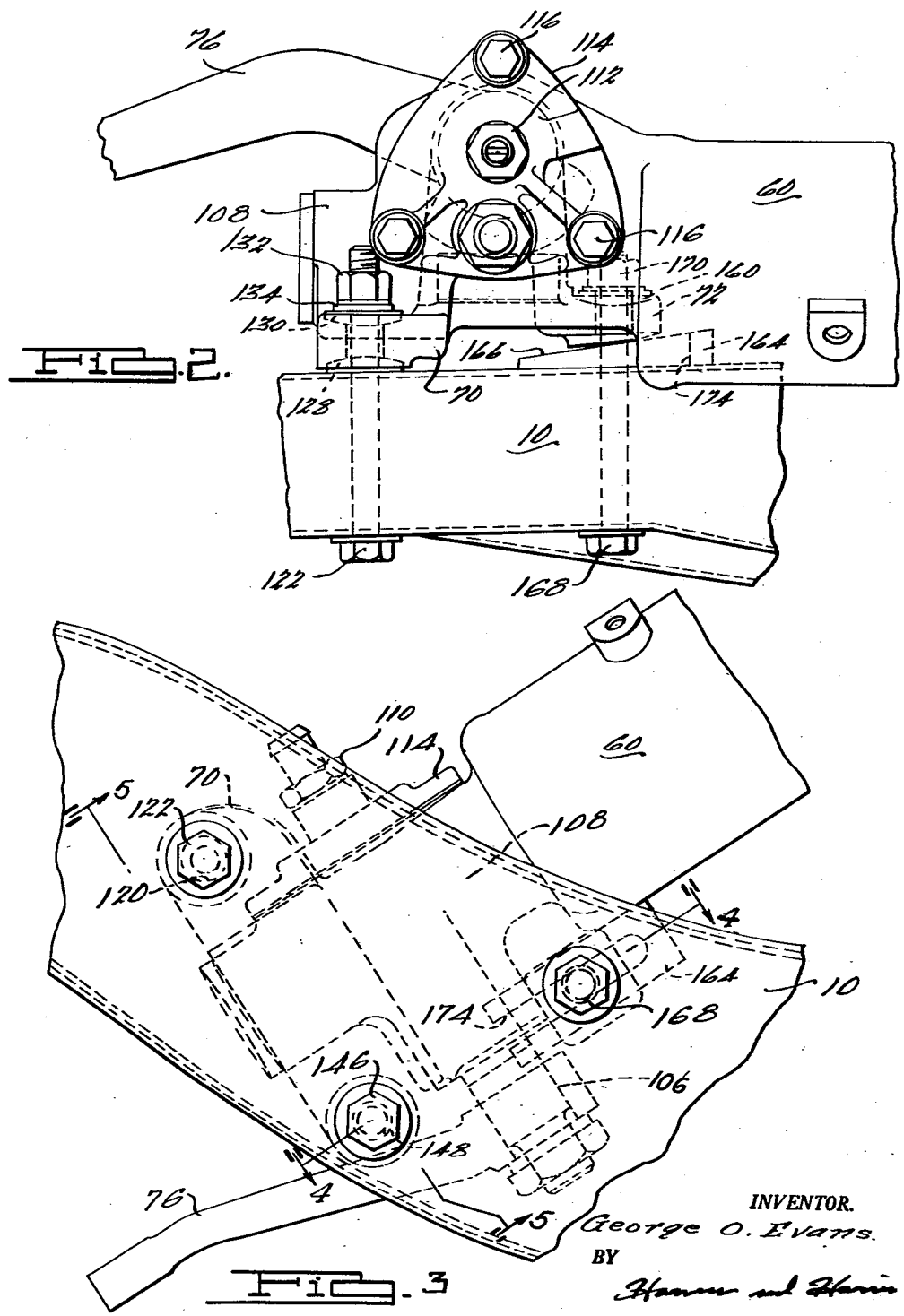

INVENTOR.
George O. Evans
BY
Harness and Harris
ATTORNEYS

United States Patent Office 2,796,142
Patented June 18, 1957

2,796,142

UNIVERSAL MOUNTING FOR VEHICLE STEERING GEAR

George O. Evans, Mount Clemens, Mich., assignor to Chrysler Corporation, Highland Park, Mich., a corporation of Delaware Application November 3, 1954, Serial No. 466,497

6 Claims. (Cl. 180—90)

My present invention relates generally to steering mechanisms for controlling the dirigible wheels of automotive vehicles or the like, and more particularly to a new and improved means for mounting such steering mechanisms in a fixed operative position upon the vehicle chassis assembly. My instant invention is particularly adapted to be applied to a power assisted steering mechanism of the type disclosed in the copending application of Alan G. Loofbourrow, Serial No. 391,209, filed November 10, 1953, which is assigned to the assignee of my instant invention, although I contemplate that it may be applied with equal success to most conventional manually operated steering mechanisms used with automotive vehicles and also to other automotive type power assisted steering mechanisms.

The steering mechanisms of the type referred to above normally include a steering column which extends from an anterior vehicle engine compartment to the passenger compartment and which carries a manually operated steering wheel at the upper end thereof. The steering column forms a portion of a vehicle steering post structure which is securely fixed at an upper portion thereof to the vehicle dash structure located within or adjacent to the vehicle passenger compartment. In the case of the conventional, manually operated steering mechanisms, the lower end of the post structure encloses a steering reduction gear means and it is normally secured to the side rail member of the vehicle frame at several closely spaced locations. In those instances where the steering mechanism embodies a power assist unit of the type which is disposed concentrically with the steering post structure, the lower portion of the power assist unit is secured to the vehicle frame side rail, and by preference, three clamping bolts are provided for this purpose.

Because of normal variations in the manufacturing tolerances and clearances which are allowed between the components of the vehicle chassis and body structure and the resulting errors in alignment of the supporting brackets for the steering mechanism, a considerable amount of time consuming difficulty has heretofore been experienced during assembly operations in properly locating and securing the steering post structure at the upper and lower ends thereof, as previously described. No uniformity in the alignment error has been observed, each vehicle presenting a new and unique alignment problem.

I have overcome this long standing problem by providing a new and improved mounting bracket structure at the lower end of the steering post by means of which the steering post may be secured to the vehicle frame side rail while simultaneously allowing a considerable amount of angular adjustment of the steering column about its lower end to compensate for these alignment errors.

The provision of an improved bracket means of the type referred to above being a principal object of my present invention, another object of my invention is to provide a bracket structure for securing a vehicle steering post or the like to a fixed structural supporting member, such as the frame side rail member of a vehicle, which will provide for a universal movement of the steering post with respect to the frame.

Another object of my present invention is to provide a means for mounting a steering post assembly to the chassis of a vehicle including mounting brackets at two axially spaced locations wherein means are provided for compensating for misalignment of one bracket with respect to the other, one bracket being secured to the vehicle frame and the other to portions of the vehicle dash structure.

Another object of my present invention is to provide a new and improved means for mounting a vehicle steering mechanism within a vehicle chassis and body assembly which is simple in construction and which may be readily adapted to quantity production techniques.

Other objects will readily become apparent from the following description of my instant invention and from the accompanying drawings.

For the purpose of more particularly describing the novel features of my instant invention, reference will be made to the accompanying drawings wherein:

Figure 2 is a plan view of the lower portion of the steering mechanism shown in Figure 1 showing the means for securing the same to the vehicle frame;

Figure 3 is a side elevation view of the structure of Figure 2;

Figure 1:
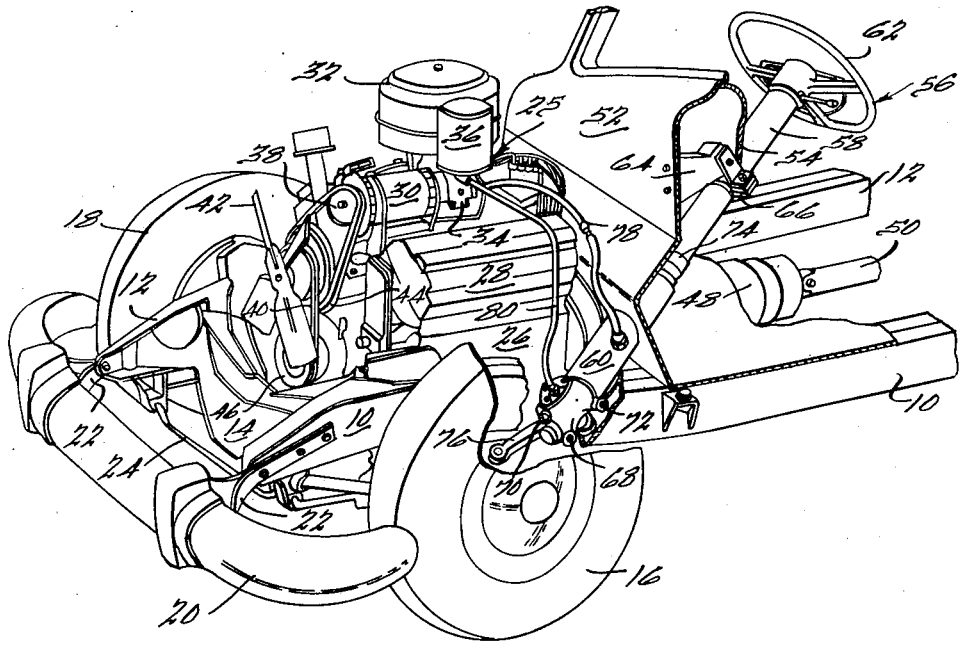
Figure 1 is an isometric view, partly in section, showing the chassis structure of a conventional automotive vehicle and including the steering mechanism.

Referring first to the isometric view of Figure 1, the two vehicle frame side rails are shown at 10 and 12, respectively, and a frame cross member is shown at 14. A pair of dirigible wheel and tire assemblies 16 and 18 is mounted at the forward portion of the frame assembly by a suitable wheel suspension mechanism in the conventional manner. A front bumper is shown at 20 and it is secured to the front horns or terminal portions of the frame side members 10 and 12 by suitable brackets 22. A front end stabilizer or sway bar may be seen at 24, said bar comprising a portion of the dirigible wheel suspension mechanism.

The vehicle engine is generally designated by numeral 25 and it includes an engine block 26, a cylinder head 28, a generator 30, an intake manifold air cleaner 32, a power steering pump 34 which is drivably coupled to the armature shaft of generator 30, a power steering pump reservoir 36, a generator belt drive 38 and a fan drive 40 for powering a fan 42 and a compound pulley 44, the latter forming a portion of the generator drive 38. The fan drive 40 is powered by an engine crankshaft pulley 46.

Figure 1 further shows portions of the vehicle transmission mechanism at 48 which is drivably connected to the engine crankshaft. A drive shaft 50 interconnects the transmission with the vehicle driving wheels at the rear of the vehicle.

A conventional engine fire wall and forward floor pan structure is shown at 52, said structure forming a portion of a vehicle body cowling which may be secured to and supported by the vehicle frame in the conventional manner. The vehicle instrument panel is designated by numeral 54 and means are provided for structurally connecting the same to the aforementioned cowling so that it forms a portion of the latter.

The vehicle steering mechanism is shown generally by means of numeral 56 and, according to the presently disclosed embodiment of my invention, it includes an upper steering post portion 58 and a co-axial type power boosting mechanism 60. A steering wheel 62 is situated at the upper end of the steering post portion 58 as shown to provide for rotary steering movements of the steering column.

A supporting bracket 64 is secured as shown to the forward fire wall structure 52 and the steering post portion 58 may be secured thereto by means of a suitable clamp device 66. The steering post structure extends in a downward direction through the engine fire wall and forward floor pan 52 into the engine compartment of the vehicle and is secured at the lower end thereof to the frame side rail 10 by means of three clamping bolts received through brackets 68, 70 and 72, said brackets being formed integrally with the lower portion of the coaxial power boosting mechanism 60. I contemplate that the upper steering post portion 58 may be secured to the lower power boosting mechanism 60 by means of a suitable clamping device 74 which encircles overlapping portions at the juncture of the mechanism 60 and the post portion 58.

A portion of the wheel and tire assembly 16 and a portion of the frame side rail member 10 are cut away as shown in Figure 1 for the purpose of more clearly illustrating the manner in which the lower portion of the steering mechanism is situated with respect to the vehicle frame. A steering arm 76 is pivotally mounted upon the lower portion of the power boosting mechanism 60 and is adapted to oscillate thereabout and to impart a steering movement to the steering linkage mechanism for the dirigible wheels 16 and 18, said steering linkage mechanism being operatively connected to the oscillating end of the arm 76.

The engine driven power steering pump 34 is adapted to supply the power boosting mechanism 60 with working fluid through a high pressure fluid delivery conduit 78 and low pressure fluid is exhausted from the power boosting mechanism 60 through an exhaust conduit 80 which communicates with the low pressure reservoir 36 situated on the low pressure intake side of the pump 34.

According to the presently disclosed embodiment of the invention the power boosting mechanism 60 is secured to the inside of the side rail member 10 as shown but I contemplate that it may also be secured in other vehicle installations to either the upper or outer sides of the side rail member 10 with equal success.

The power boosting mechanism 60 referred to above has been fully disclosed in the above mentioned copending application of Alan G. Loofbourrow, Serial No. 391,209, and reference may be had thereto for the purpose of supplementing my instant disclosure.

As best seen in Figures 2 and 3 a rocker shaft 106 is transversely disposed within a lower housing portion 108 of the power boosting mechanism 60 and a fluid fitting 110 is situated as shown for the purpose of providing communication between the exhaust conduit 80 and the interior of the housing portion 108. A suitable gear sector adjusting means may be provided as shown at 112 on a cast cap member 114, the latter being bolted to the exterior of the housing portion 108 by means of bolts 116.

Figure 5:
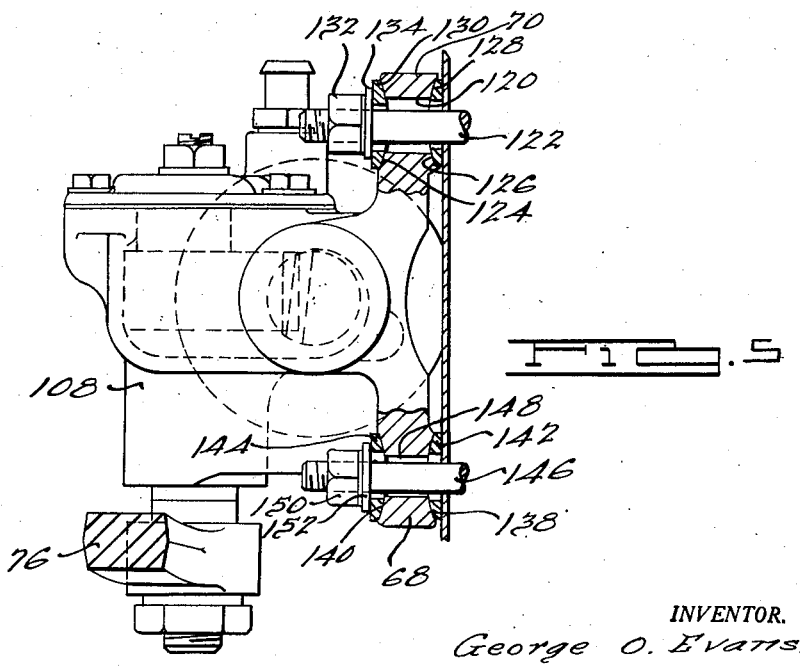
Figure 5 is a sectional view taken along the section line 5—5 of Figure 3.

The bracket 70 is formed on the housing portion 108 and is provided with a central aperture 120 through which a clamping bolt 122 may be received. As best seen in Figures 3 and 5 the frame side rail member 10 may be of a box type construction and a bolt 122 may extend transversely through aligned openings formed in the side rail 10. The bracket 70 is provided with conical recesses 124 and 126 at each of the opposite sides thereof, respectively. A convex, spherically formed washer 128 is received in the recess 126 and is positioned between the bracket 70 and the side rail member 10 as shown in Figure 5. Likewise, a spherical washer 130 is received in the recess 124. A nut 132 and a suitable washer 134 are received over the end of the threaded bolt 122, the latter being adapted to secure the recessed bracket 70 between the opposed spherical washers 128 and 130.

The bracket 68, which is similar in contour to bracket 70, is formed on the housing portion 108 as best seen in Figures 2 and 5 and it is provided with spherically formed recesses 138 and 140. Spherical washers 142 and 144 are received in the recesses 138 and 140, respectively, and a clamping bolt 146 may be received through the washers 142 and 144 and an enlarged opening 148 formed in the bracket 68. A nut 150 and a washer 152 are received over the threaded end of the bolt 146 and are effective to retain the spherical washers 142 and 144 in clamping engagement with the opposed sides of the bracket 68.

Figure 4:
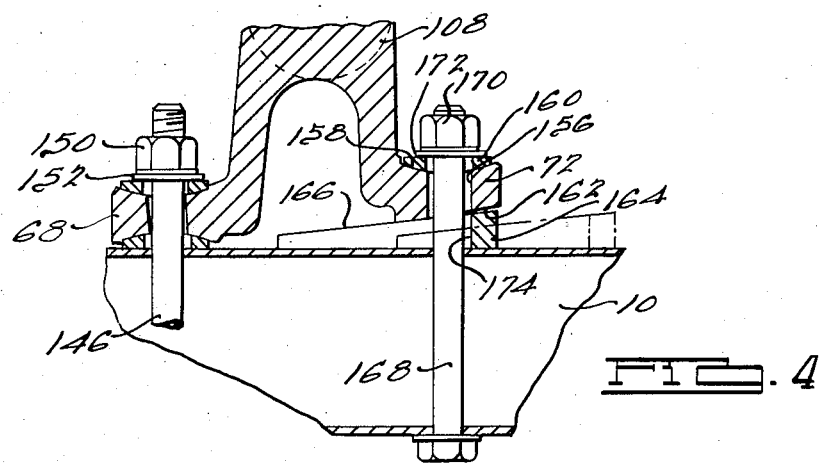
Figure 4 is a sectional view taken along the section line 4—4 of Figure 3.

The third bracket 72 is formed on the housing portion 108 in an axially spaced position with respect to the brackets 68 and 70 and is similarly apertured as shown in Figures 2 and 4 at 156. The upper surface of the bracket 72, as viewed in Figure 4, is provided with a spherical recess 158 within which a spherical washer 160 is received and the lower surface of the bracket 72 is provided with a slope as shown at 162. A wedge element 164 is interposed between the sloping surface 162 of the bracket 72 and the side of the side rail member 10. The wedge member 164 may be provided with a surface 166 having a slope substantially equal to the slope of the surface 162 formed on bracket 72. A clamping bolt 168 is transversely received through aligned openings in the side rail member 10 and through the opening 156 of the bracket 72, the threaded end of the bolt 168 receiving a nut member 170 and a suitable washer 172. The bracket 72 is thereby secured between the spherical washer 160 and the wedge member 164.

The wedge member 164 is provided with a slot 174 to accommodate the bolt 168, said slot being best seen in Figures 3 and 4.

In assembling the above described steering mechanism in position the bracket 68 is first secured in place by means of the clamping bolt 146 between the spherical washers 142 and 144. The steering mechanism is then adjusted so that the center line thereof is in alignment with the clamping, supporting brackets 64 and 66 on the vehicle cowling structure. Since the aperture in the bracket 68 is substantially greater than the diameter of the bolt 146 a considerable amount of universal movement of the steering mechanism may be allowed by virtue of a sliding movement which may take place between the spherical washers 142 and 144 and the mating spherical recesses 138 and 140. It is thus seen that the connection between bracket 68 and the frame side rail member 10 is analogous to a ball and socket joint.

The upper portion 58 of the steering mechanism may then be readily secured in place by means of the clamping element 66 and the bracket 64 after the bracket 68 has been secured to the frame as above described. The bracket 70 is then secured in the same manner to the frame side rail member 10, the spherical washers 128 and 139 being positioned to accommodate the aforementioned angular adjustment between the steering mechanism and the vehicle frame. As best illustrated in Figure 4, the enlarged aperture 120 in the bracket 70 is adapted to accommodate a considerable amount of adjustment of the housing portion 108 with respect to the side rail member 10 without causing interference with the bolt 122. The spherical washers 128 and 130 become self-positioned as shown in Figure 4 so that the flat surface of the washer 128 is at all times flush against the side of the side rail member 10 and the upper flat surface of the washer 130 is at all times in a plane parallel to the side of the side rail member 10.

After the steering mechanism is secured to the dash structure, as above described, and after the lower portion of the steering mechanism is securely clamped by the clamping bolts 122 and 146, the wedge member 164 may be dropped into place so that the gap which would normally occur between the bracket 72 and the side rail member 10 will no longer exist. The clamping bolt 168 may then be tightened and spherical washer 160 will simultaneously adjust itself so that the flat upper surface of the washer 160 will be parallel to the side rail member 10.

The above described mounting means is capable of automatically compensating for substantially large errors in alignment in the steering gear brackets and a uniform standard operating procedure may be employed for all vehicles during assembly and servicing operations.

What I claim and desire to secure by U. S. Letters Patent is:

1. In an automotive vehicle comprising a frame, a body, said body including vehicle dash structure, and a steering mechanism defining a rigid post structure; means for securing said post structure in an operative position including a pair of brackets formed near one end of said post structure, the brackets of said pair having concave opposed surfaces, a third apertured bracket formed near said one end of said post structure, said third bracket being spaced axially from said pair of brackets and having a tapered surface and an opposed concave surface, a convex washer disposed on each of said concave surfaces in mating relationship therewith, a wedge element disposed against said tapered surface, fastening means including a clamping bolt extending through the aperture in each of said brackets and the associated washers therefor for securing said one end of said post structure to said frame, and holding bracket means for securing said post structure near the other end thereof to said dash structure, said washers having one flat surface positioned parallel with respect to said frame, the diameter of the opening in each of said brackets being substantially larger than that of the bolt means associated therewith, said mating washers and concave surfaces being adapted to accommodate angular adjustments of said post structure about the axis of the bolt extending through one aperture of said pair of brackets and about a transverse axis extending between said pair of brackets to compensate for misalignment of said upper bracket means, said wedge element being interposed between said third bracket and said frame to provide a backing for the former.

2. In an automotive vehicle comprising a frame, a body, said body including vehicle dash structure situated above said frame, and a steering mechanism defining a rigid post structure; means for securing said post structure in an operative position in a substantially vertical plane extending from the front end toward the rear of the vehicle, said means including a pair of brackets formed near the lower end of said post structure, the brackets of said pair having concave opposed surfaces with a centrally disposed hole therein, a third bracket formed near the lower end of said post structure, said third bracket being spaced axially from said pair of brackets and having a tapered surface and an opposed concave surface, each of said brackets having holes formed therethrough at the center of the respective concave surfaces thereof, a convex washer disposed on each of said concave surfaces in mating relationship therewith, a wedge element disposed against said tapered surface, a clamping bolt means extending through the holes in each of said brackets and the associated washer therefor for securing said one end of said post structure to said frame, and holding bracket means for securing said post structure near the upper end thereof to said dash structure, the hole in one of said pairs of brackets being enlarged to permit an angular adjustment of said steering mechanism in one direction with respect to said frame about the bolt means associated with the other of said pairs of brackets, said mating washers and concave surfaces being adapted to accommodate angular adjustments of said post structure in a direction transverse to said one direction, said angular adjustments being effective to compensate for misalignment of said holding bracket means, said wedge element being interposed between said third bracket and said frame to provide a backing for the former as the clamping force of the bolt means associated with said third bracket is applied.

3. The combination as set forth in claim 2 wherein the holes in each of said brackets are substantially larger than the bolt means associated therewith to accommodate misalignment between the same.

4. The combination as set forth in claim 2 wherein the said frame comprises a vertical side and wherein said pair of brackets and said third bracket are secured to said vertical side.

5. In an automotive vehicle comprising a frame, a body including dash structure situated above said frame, and a vehicle steering mechanism including a rigid steering post structure; means for adjustably securing said post structure in an operative position with one end thereof disposed below the other, a first and a second apertured bracket formed on the lower end of said post structure, a spherical recess formed about the aperture of each of said first and second brackets on opposed sides thereof, a washer situated in each of said spherical recesses, said washers having a spherical contour on one side thereof in registry with its respective recess, the other side of said washers being substantially flat, fastening means including a clamping bolt received through each of said apertured brackets for securing the lower end of said post structure to said frame, the diameter of the apertures in said first and second brackets being substantially larger than the diameter of said clamping bolts, said spherical recesses and washers accommodating an adjustment of said steering post about the axis of one of said clamping bolts and an adjustment about a transverse axis extending between said bolts, a third apertured bracket spaced axially from said first and second brackets with one side thereof having a spherical recess about the aperture thereof and with a tapered surface on the other side thereof, a wedge adapted to be received between said tapered surface and said frame, a slot formed in said wedge to provide for adjustment of said wedge with respect to said third bracket, said fastening means including a third clamping bolt extending through said third bracket and the slot in said wedge, and holding bracket means for securing said post structure near the upper end thereof to said dash structure.

6. In an automotive vehicle comprising a frame, a body, said body including vehicle dash structure, and a steering mechanism including a rigid steering post structure; means for securing said post structure in an operative position including a pair of brackets formed near the lower end of said post structure, the brackets of said pair having concave opposed surfaces with a centrally disposed hole therein, a third apertured bracket formed near the lower end of said post structure, said third bracket being spaced axially from said pair of brackets and having a tapered surface and an opposed concave surface, a convex washer disposed on each of said concave surfaces in mating relationship therewith, a wedge element disposed adjacent said tapered surface, a clamping bolt means extending through each of said brackets and the associated washer for securing the lower end of said post structure to said frame, an upper bracket means for securing said post structure near the upper end thereof to said dash structure, said mating washers and concave surfaces being adapted to accommodate angular adjustments of said post structure to compensate for misalignment of said upper bracket means, said wedge element being interposed between the tapered surface of said third bracket and said frame, and an elongated slot formed in said wedge element for receiving the bolt means for said third bracket, said wedge being adapted to assume any of a plurality of positions with respect to said third bracket thereby accommodating variations in the magnitude of the gap between said third bracket and said frame.

(References on following page)

References Cited in the file of this patent

UNITED STATES PATENTS

| | | |
|---|---|---|
| 762,197 | Rogers | June 7, 1904 |
| 1,125,621 | Winton | Jan. 19, 1915 |
| 1,323,815 | Belden | Dec. 2, 1919 |
| 1,525,139 | Link | Feb. 3, 1925 |
| 1,865,130 | Moorhouse | June 28, 1932 |
| 2,281,555 | Castiglia | May 5, 1942 |
| 2,542,907 | Dayton et al. | Feb. 20, 1951 |

FOREIGN PATENTS

| | | |
|---|---|---|
| 434,896 | Great Britain | Sept. 11, 1935 |